United States Patent [19]

Thun

[11] 4,171,822
[45] Oct. 23, 1979

[54] DUAL PEDAL CRANK ASSEMBLY FOR BICYCLE

[75] Inventor: Alfred H. Thun, Ennepetal, Fed. Rep. of Germany

[73] Assignee: Firma Alfred Thun & Co. GmbH, Ennepetal, Fed. Rep. of Germany

[21] Appl. No.: 868,419

[22] Filed: Jan. 10, 1978

[51] Int. Cl.² ............................................... B62M 1/02
[52] U.S. Cl. .................................. 280/259; 74/594.1; 403/355; 403/379
[58] Field of Search ............... 280/259; 74/560, 594.1; 403/324, 355, 374, 378, 379, 383

[56] References Cited

U.S. PATENT DOCUMENTS

| | | | |
|---|---|---|---|
| 939,933 | 11/1909 | Trautner | 403/374 X |
| 1,006,895 | 10/1911 | Albree | 403/374 X |
| 2,017,123 | 10/1935 | Harbert | 403/374 X |
| 2,350,468 | 6/1944 | Kraeft | 74/594.1 |

Primary Examiner—Joseph F. Peters, Jr.
Assistant Examiner—Michael Mar
Attorney, Agent, or Firm—Karl F. Ross

[57] ABSTRACT

A dual pedal crank assembly for a bicycle or the like has a shaft defining a shaft axis and having a pair of ends one of which is flatted and tapered axially away from the other end. This one end further forms a locking surface lying substantially in a plane inclined to the shaft axis and forming therewith an acute angle pointed toward the other shaft end. A fixed crank cast integrally with the shaft lies on and defined a fixed-crank axis generally perpendicular to the shaft axis. A removable crank extending along a removable-crank axis is formed with a recess centered on a recess axis generally perpendicular to the removable-crank axis, and complementarily shaped to the one end of the shaft so that this one end can be received in the recess with the removable-crank and shaft axes aligned. The crank is further formed with a bore centered on a bore axis spaced from the recess axis and lying in a plane generally perpendicular to the recess axis. A tapered key is receivable in this bore and has a flat face flatly engageable with a locking surface of the one end of the shaft. A nut carried on the end of the key may be to draw the locking surface and flat face of the key tightly together so as to lock the removable crank tightly on the shaft end.

5 Claims, 3 Drawing Figures

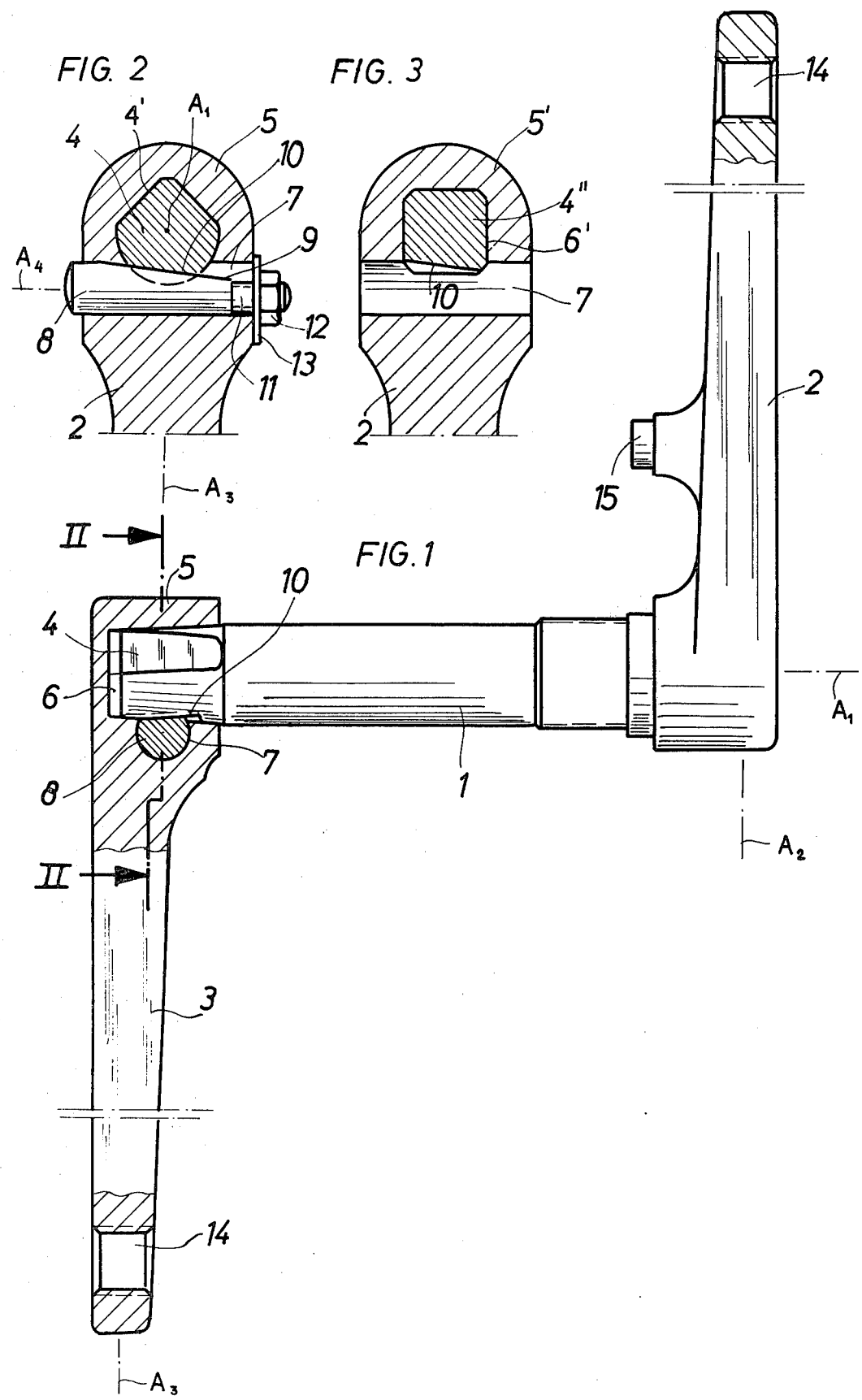

DUAL PEDAL CRANK ASSEMBLY FOR BICYCLE

FIELD OF THE INVENTION

The present invention relates to a dual-pedal-crank assembly. More particularly, this invention concerns such an assembly used to carry the drive pedals for a bicycle.

BACKGROUND OF THE INVENTION

The two pedals of a bicycle or the like are normally mounted as shown in U.S. Pat. No. 3,906,811 on a crank assembly comprising a central axis-defining shaft carrying at each end a crank that carries a respective pedal. These cranks normally lie on respective axes perpendicular to the shaft axis, and the pedals are journaled in the outer ends of the cranks for rotation about respective axes parallel to the shaft axis, but diametrically offset therefrom relative to each other.

Normally one of the cranks is cast integrally with the shaft and the other crank is removable. To this end the shaft end for the removable crank is of polygonal section or formed with at least one flat. The removable crank has a correspondingly shaped throughgoing hole of constant cross section into which this one end of the shaft can fit. Furthermore, the removable crank is formed with a cleft or slot that opens into this throughgoing bore, and a bolt extending across this cleft can be used to deform the removable crank and clamp the two sides of this bore tightly against the shaft end.

As it is necessary to form such a cleft by cutting or the like, and thereafter to form a bore for the clamping screw, the fabrication costs of such a crank, which is normally made out of a light metal, are somewhat high. Furthermore it is often impossible to tighten the removable crank adequately, in particular when the flatted shaft end wears somewhat.

OBJECTS OF THE INVENTION

It is therefore an object of the present invention to provide an improved dual pedal crank assembly.

Another object is the provision of such an assembly which can be produced at relatively low cost, yet which can be easily and surely tightened on the drive shaft.

SUMMARY OF THE INVENTION

These objects are attained, according to the present invention, in a dual pedal crank assembly of the above-described general type, but wherein the removable crank is formed with a tapered recess and the corresponding end of the shaft is also tapered. Furthermore, the one shaft end is formed with a locking surface that lies substantially in a plane inclined to the shaft axis and forming therewith an acute angle pointed toward the other shaft end. The removable crank is furthermore formed with a throughgoing transverse bore lying on a bore axis spaced from the axis of the recess and lying in a plane generally perpendicular to this recess axis. A tapered key is receivable in this bore and has a flat face flatly engageable with the locking surface of the one end of the shaft when this one end is in the recess. Means is provided for retaining the key in the bore with its face in tight surface contact with the locking surface of the shaft so as to lock the one end of the shaft tightly in the recess.

Thus in accordance with this invention the complementarily shaped recess and shaft end ensure excellent torque transmission between the removable crank and the shaft. At the same time the use of a flatted key with a surface tipped relative to the shaft axis ensures that as the key is tightened by being drawn along the bore axis it inherently pulls the shaft more tightly into the recess and ensures an even better fit therebetween. Furthermore it is possible with such an arrangement to compensate for some wear of the shaft end and the recess by merely tightening the key.

According to another feature of this invention, the bore for the key is substantially cylindrical and the key itself is formed with a largely cylindrical body having a planar face inclined to the axis of this body. The small end of this tapered key is threaded so that a nut constituting the tightening means can be screwed onto it and braced against the side of the removable crank.

The shaft end may be of polygonal section, or may be semicylindrical in the region of the locking surface but provided with one or two flats on its opposite side. The locking surface lies in a plane which is not only inclined to the shaft axis, but which is also inclined to the bore axis when the shaft end is snugly received in the recess. The angle at which the plane of the locking surface extends relative to the bore axis is identical to the angle at which the face of the key extends to the bore axis when the key is in the bore.

BRIEF DESCRIPTION OF THE DRAWING

FIG. 1 is an elevational view, partly in section, illustrating a dual pedal crank assembly according to this invention;

FIG. 2 is a section taken along line II—II of FIG. 1; and

FIG. 3 is a view similar to 2 illustrating an alternative construction according to this invention.

SPECIFIC DESCRIPTION

As shown in FIGS. 1 and 2, a dual pedal crank assembly according to this invention has a generally cylindrical shaft 1 having an axis $A_1$ and integrally cast with a fixed crank 2 extending along an axis $A_2$ perpendicular to the axis $A_1$. The two parts 1 and 2 are made of light metal, such as a strong aluminum, Al—Mg or Mg alloy.

The shaft 1 has a flatted tapered end 4 opposite the crank 2 and carries on this end 4 a removable crank 3 of the same general dimensions as the crank 2 and having an axis $A_3$ which extends perpendicularly to the axis $A_1$. This crank 3 has an eye end 5 formed with a recess 6 of complementary shape to the flatted shaft end 4. In addition at its end 5 the crank 3 is formed with a transverse throughgoing cylindrical bore 7 centered on an axis $A_4$ spaced from the axis $A_1$ and lying in a plane perpendicular thereto.

A key 8 of generally cylindrical shape but formed with an inclined face 9 is engageable with a face 10 formed on the end 4 of the shaft 1. The face 9 lies at a small acute angle, here approximately 10°, to the axis $A_4$ when the key 8 is in the bore 7. The surface 10 is correspondingly tipped relative to this axis $A_4$. In addition, the flat surface 10 is inclined to the axis $A_1$ as best shown in FIG. 1 so that it forms an acute angle therewith pointing toward the fixed crank 2.

The key 8 has at its narrow end a threaded portion 11 on which is engaged a nut 12 bearing via a washer 13 on the side of the eye part 5 of the crank 3. Thus, rotation of this nut 12 will force the surfaces 9 and 10 tightly together in surface contact so as not only to force the flats 4' of the tapered end part 4 tightly against the corresponding flats of the recess 6, but also so as to pull the entire shaft 1 and removable crank 3 axially toward each other.

The cranks 2 and 3 are formed at their outer ends with threaded bores 14 adapted to receive respective pedals. In addition the crank 2 has a small pin-like extension 15 spaced from but extending parallel to the axis $A_1$, and adapted to engage in a hole in a sprocket for the drive chain of a bicycle.

FIG. 3 shown how the shaft 1 can have an end 4" of square section but otherwise identical to the end 4. The eye part 5' has a recess 6' of correspondingly square section. Any polygonal shape could be used so long as the end of the shaft has at least one flat for best torque transmission between the crank 3 and shaft 1.

I claim:

1. A dual pedal crank assembly of light metal comprising:
   a shaft defining a shaft axis and having a pair of ends one of which is provided with plurality of flats and tapered axially from the other end, said flats including a locking surface lying substantially in a plane inclined to said shaft axis and forming therewith an acute angle pointed toward said other end;
   a fixed crank integral with said shaft at said other end and lying on and defining a fixed-crank axis generally perpendicular to said shaft axis;
   a removable crank transverse to said shaft axis and removably mounted on said one end, said removable crank having an eye formed with a recess shaped complementarily to said one end of said shaft to form-fittingly receive said one end, said crank further being formed with a throughgoing substantially cylindrical bore spaced from and transverse to said shaft axis;
   a generally cylindrical key received in said bore and having a flat face flatly engaging said locking surface of said one end, said face converging toward the axis of the key in the direction of one end thereof; and
   means engaging said end of said key for retaining said key in said bore with said face in tight surface contact with said locking surface for locking said one end of said shaft tightly in said recess.

2. The assembly defined in claim 1 wherein said fixed crank and said shaft are unitary.

3. The assembly defined in claim 1 wherein said end of said key is threaded and normally projects beyond said removable crank, said means including a nut threaded onto said end of said key and bearing on said removable crank.

4. The assembly defined in claim 1 wherein said acute angle is smaller than 30°.

5. The assembly defined in claim 1 wherein said one end of said shaft is of generally polygonal section.

* * * * *